(12) United States Patent
Yuzawa

(10) Patent No.: US 6,485,097 B1
(45) Date of Patent: Nov. 26, 2002

(54) VEHICLE SEAT HAVING CONTAINER HOLDER

(75) Inventor: Yoshikuni Yuzawa, Tochigi (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

(21) Appl. No.: 09/968,761

(22) Filed: Oct. 3, 2001

(30) Foreign Application Priority Data

Aug. 9, 2001 (JP) ........................................ 2001-242219

(51) Int. Cl.[7] .................................................. A47C 7/62
(52) U.S. Cl. .............................. 297/188.01; 297/188.21
(58) Field of Search ........................ 297/188.01, 188.13, 297/188.07, 188.19, 188.21, 188.08, 188.14; 248/311.2, 316.5, 291.1, 292.11, 292.13; 224/275

(56) References Cited

U.S. PATENT DOCUMENTS

| 5,085,390 A | * | 2/1992 | Murphy | 248/205.5 |
| 5,104,187 A | * | 4/1992 | Fischer et al. | 248/311.2 |
| 5,358,307 A | * | 10/1994 | Shafer et al. | 224/275 |
| 5,690,308 A | * | 11/1997 | Jankovic | 248/311.2 |
| 6,024,411 A | * | 2/2000 | Pesta et al. | 296/65.01 |
| 6,085,953 A | * | 7/2000 | Bober et al. | 224/282 |
| 6,095,471 A | * | 8/2000 | Huang | 224/400 |
| 6,375,266 B1 | * | 4/2002 | Ferguson et al. | 297/423.15 |

FOREIGN PATENT DOCUMENTS

| GB | 505309 | * | 5/1939 | 297/217.3 |
| JP | 4060921 7 A | * | 5/1994 | 248/311.2 |

* cited by examiner

Primary Examiner—Milton Nelson, Jr.
Assistant Examiner—Sarah C. Burnham
(74) Attorney, Agent, or Firm—Oliff & Berridge, PLC

(57) ABSTRACT

A vehicle seat which has a container holder that is not disfigured when subjected to load is provided. The vehicle seat comprises a seat body and a cup holder attached to a side of the seat body. The cup holder comprises a base member, a saucer member of which a base edge portion is turnably supported to a lower portion of the base member, engaging claws formed on the saucer member, and engaging tips which hold the saucer member in an approximately horizontal position by engaging with the engaging claws. When the engagement between the engaging claws and engaging tips is released by an accidental load, the saucer member turns downward. The abutment of the front edge portion of the saucer member with the floor of the interior stops the turn. A lower edge portion of the side of the seat body is provided with a projection.

4 Claims, 11 Drawing Sheets

VEHICLE SEAT HAVING CONTAINER HOLDER

BACKGROUND OF THE INVENTION

1. Field of the Invention

The present invention relates to a vehicle seat which is provided with a container holder which holds a container, such as a can, a PET bottle, a cup or the like for drinks.

2. Description of Related Art

The interior of a vehicle or the like is provided with a container holder which is the so-called cup holder for holding a can or the like for drinks. The container holder comprises a base member extending vertically and a saucer member for holding a bottom surface of the container. A base edge portion of the saucer member is connected to a hinge which is disposed to a front surface of a lower edge portion of the base member, so that the saucer member is turnable up and down on the hinge. When the saucer member is housed, the saucer member is approximately parallel to the base member and disposed in the standing position. On the other hand, when the passenger or occupant opens and levels off the saucer member in order to use the container holder, a first stopper which is provided to the saucer member is brought into contact with a second stopper which is integrally formed with the base member. Thereby, the saucer member is maintained in an approximately horizontal position.

When the saucer member is disposed in the horizontal position, if the passenger pushes the saucer member in the direction of turning downward the saucer member by accident, an excessive load is applied to the first stopper, the second stopper or the hinge, thereby the first stopper, the second stopper or the hinge breaks. For handling such a problem, when the first stopper or the second stopper is made to have flexibility, even if the excessive load is applied to the saucer member in the direction of turning downward, the first stopper or the second stopper bends, releasing the contact between the first stopper and the second stopper. Accordingly, the saucer member turns downward beyond the horizontal position, so that the breakage of the first stopper, the second stopper or the hinge is prevented. The container holder having the above-described structure may be attached to a side portion of a seat on which the passenger sits. In this case, when the saucer member is held in the standing position, since the saucer member is approximately parallel to the base member, there is a gap between the base member and the saucer member at a lower portion of the container holder. That is, because the hinge is viewed from under the container holder, and because there is the gap between the base member and the saucer member, they may cause disfigurement of the seat as a whole. Then, if a cover or the like is attached to the side portion of the seat in order to cover the lower portion of the container holder, the cover interferes with the downward turning of the saucer member.

SUMMARY OF THE INVENTION

The present invention was developed in view of the above-described problems. Therefore, an object of the present invention is to provide a vehicle seat that has a container holder which is not broken even if a saucer member turns downward beyond a horizontal position by an accidental load, and that is not disfigured.

In order to accomplish the above-described object, in one aspect of the present invention, a vehicle seat having a container holder comprises a container holder and a seat body. The container holder comprises a base member extending vertically, and a saucer member which is turnable up and down, of which a base edge portion is supported to a lower portion of a front surface of the base member. The container holder also comprises a first engaging portion provided to the saucer member, and a second engaging portion which is attached to the base member and which holds the saucer member in a horizontal position which is approximately horizontal by engaging with the first engaging portion. A container can be placed on the saucer member when the saucer member is held in the horizontal position. When at least one of the first engaging portion and the second engaging portion bends, engagement between the first engaging portion and the second engaging portion is released, so that the saucer member turns downward. The seat body is mounted on a floor of an interior of a vehicle. The base member is attached to the seat body in a side portion thereof. The seat body is provided with a projection on a side cover of the seat body. The projection projects below a bearing between the base member and the saucer member. The saucer member is set such that a downward turning of the saucer member is stopped when the saucer member turns downward beyond the horizontal position and another edge portion of the saucer member is brought into contact with the floor. Further, the projection has a shape along a surface of the saucer member when another edge portion of the saucer member abuts with the floor.

For example, a distance between the floor and the container holder (or between the floor and the base member), which is a distance in the vertical direction, may be set so that another edge portion of the saucer member will be brought into contact with the floor when the saucer member turns downward beyond the horizontal position. A distance between the floor and the bearing (that is, the base edge portion) of the saucer member, or a distance between the base edge portion and another edge portion of the saucer member may be set instead of the distance between the floor and the container holder.

According to the vehicle seat, the first engaging portion engages with the second engaging portion, thereby the saucer member is maintained in the horizontal position. Thus, the container can be placed on the saucer member. When the saucer member which is held in the horizontal position receives an excessive load in the direction of downward turning because of, for example, carelessness of the passenger, at least one of the first engaging portion and the second engaging portion bends. Thus, the engagement between the first engaging portion and the second engaging portion is released, so that the saucer member can turn downward further. Accordingly, the first engaging portion and the second engaging portion do not receive the excessive shearing force, so that the first engaging portion and the second engaging portion are not broken.

When the saucer member turns downward beyond the horizontal position, another edge portion of the saucer member is brought into contact with the floor of the interior, so that the turn of the saucer member is stopped. Thus, the angle of downward turning of the saucer member becomes small, and the projection can project to the lower side of the bearing of the saucer member. That is, the projection covers the space between the saucer member and the base member from the lower side. Accordingly, since the projection covers the bearing of the saucer member, it does not cause disfigurement of the vehicle seat with container holder. Therefore, the appearance and merchantability of the vehicle seat having container holder is improved, and the touch with the hand, finger or the like of the passenger or the like on the bearing of the saucer member is prevented. Further, in case the saucer member turns downward beyond the horizontal position, the floor of the interior receives another edge portion of the saucer member. When the saucer member abuts with the floor, the projection follows the front surface of the saucer member. Thus, the saucer member is not hit against the projection with great force, suppressing the hurts of the projection and the saucer member. The breakage of the projection and the saucer member can also be suppressed.

In the vehicle seat having a container holder, an angle of turn of the saucer member from the horizontal position of the saucer member to a position of the saucer member when the another edge portion of the saucer member is brought into contact with the floor is smaller than 90 degrees.

According to the vehicle seat having a container holder, the angle of turn of the saucer member between the horizontal position to a position when the another edge portion of the saucer member abuts with the floor is smaller than 90 degrees. Thus, the projection covers larger area of the bearing of the saucer member and covers larger area of the space between the saucer member and the base member from the lower side. Therefore, the appearance and merchantability of the vehicle seat having container holder is improved.

In accordance with another aspect of the present invention, a vehicle seat having a container holder comprises a container holder and a seat body. The container holder comprises a base member extending vertically, and a saucer member which is turnable up and down, of which a base edge portion is supported to a lower portion of the base member. A container can be placed on the saucer member when the saucer member is held in a horizontal position. The saucer member is capable of turning downward from the horizontal position. The seat body is mounted on a floor of an interior of a vehicle. The base member is attached to the seat body in a side portion thereof. The seat body is provided with a projection on a side cover of the seat body. The projection projects below a bearing between the base member and the saucer member. The saucer member is set such that a downward turning of the saucer member is stopped when the saucer member turns downward beyond the horizontal position and another edge portion of the saucer member is brought into contact with the floor. The projection has a shape along a surface of the saucer member when another edge portion of the saucer member abuts with the floor.

BRIEF DESCRIPTION OF THE DRAWINGS

The above and other objects, features and advantages of the invention will become more apparent from the following description taken in conjunction with the accompanying drawings wherein like references refer to like parts and wherein.

PREFERRED EMBODIMENT OF THE INVENTION

Figure 1:
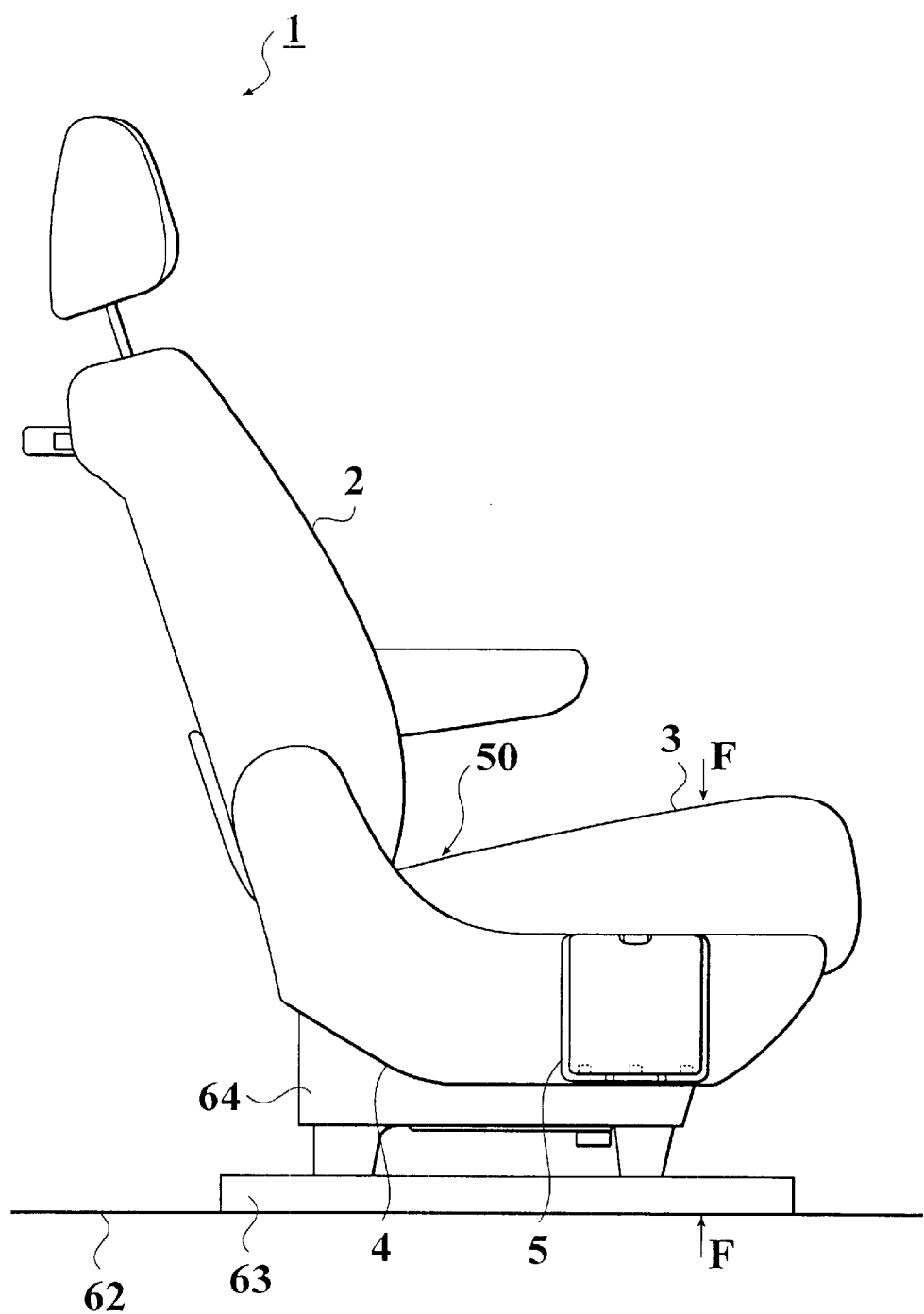
FIG. 1 is a side view of a vehicle seat having a container holder, according to an embodiment of the present invention.

An embodiment of a vehicle seat having a container holder in accordance with the present invention will be explained with reference to drawings. However, the scope of the present invention is not limited to the example shown in the drawings.

FIG. 1 is a side view of a vehicle seat 1. The vehicle seat having a container holder according to the present invention is applied to the vehicle seat 1 which is disposed in the interior of the vehicle. The vehicle seat 1 comprises a seat body 50 comprising a seat back 2, a seat bottom 3 and a side cover 4. The vehicle seat 1 also comprises sliding rails 63 and a seat base 64.

The sliding rails 63 are laid on the floor 62 of the interior. The seat base 64 is movably attached to the sliding rails 63 in the longitudinal direction of the vehicle. The seat bottom 3 is disposed on the seat base 64. The seat back 2 is disposed on the rear portion of the seat bottom 3 and extends upward. When the passenger sits in the seat body 50, the buttocks of the passenger are put on the seat bottom 3 and the back of the passenger is supported by the seat back 2.

The side cover 4 is attached on a side portion of the seat back 2 and the seat bottom 3, and extends in an L-like shape from a lower portion of the seat back 2 to a neighborhood of a fore edge of the seat bottom 3. The side cover 4 functions as a side portion of the seat body 50.

The vehicle seat 1 further comprises a cup holder, that is, a container holder 5, which is integrally attached to the side cover 4. The cup holder 5 is attached to a fore portion of the side cover 4, and is disposed at a position a predetermined distance apart from a rear edge of the seat bottom 3 toward the front. That is, the cup holder 5 is disposed in a range where the passenger can get at the cup holder 5, even if the passenger sits in the seat bottom 3 in a forward-looking attitude. The cup holder 5 is used for holding a can, a PET bottle, a cup or the like (hereinafter, it is referred to as "a container") for drinks.

Figure 2:
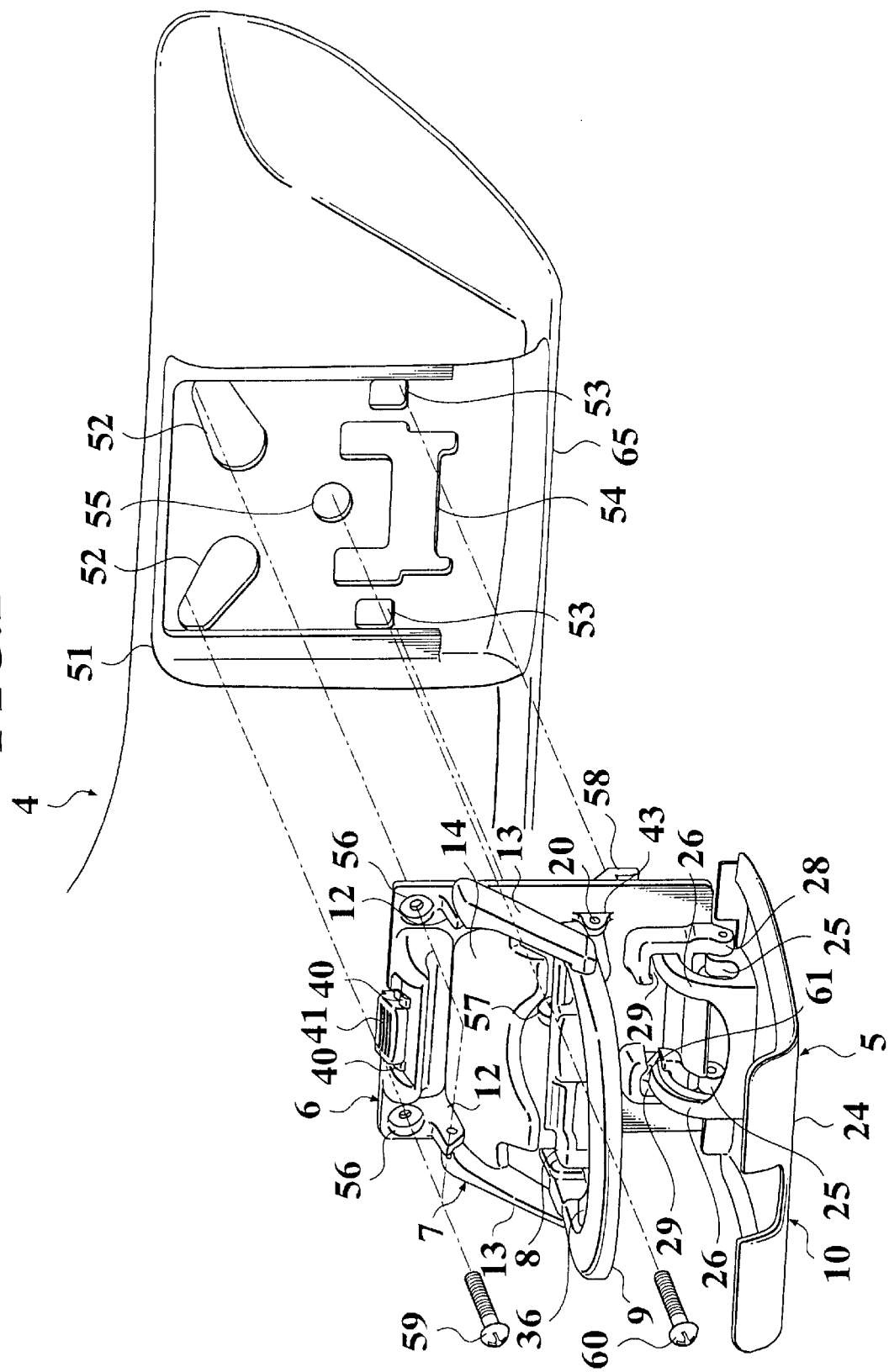
FIG. 2 is a perspective exploded view of the container holder which is detached from a side cover of the vehicle seat.
Figure 3:
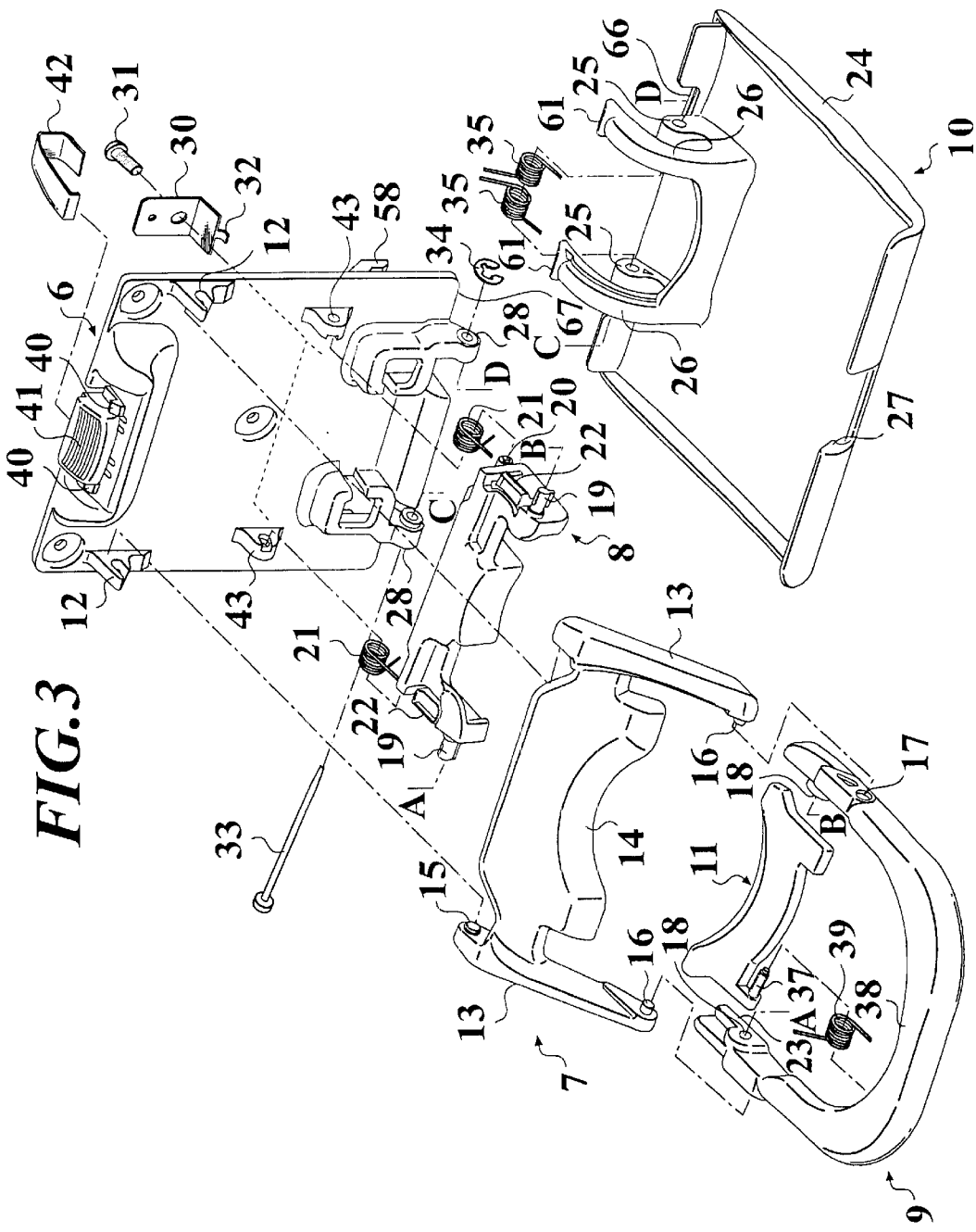
FIG. 3 is a perspective exploded view of the container holder according to the embodiment of the present invention.
Figure 4:
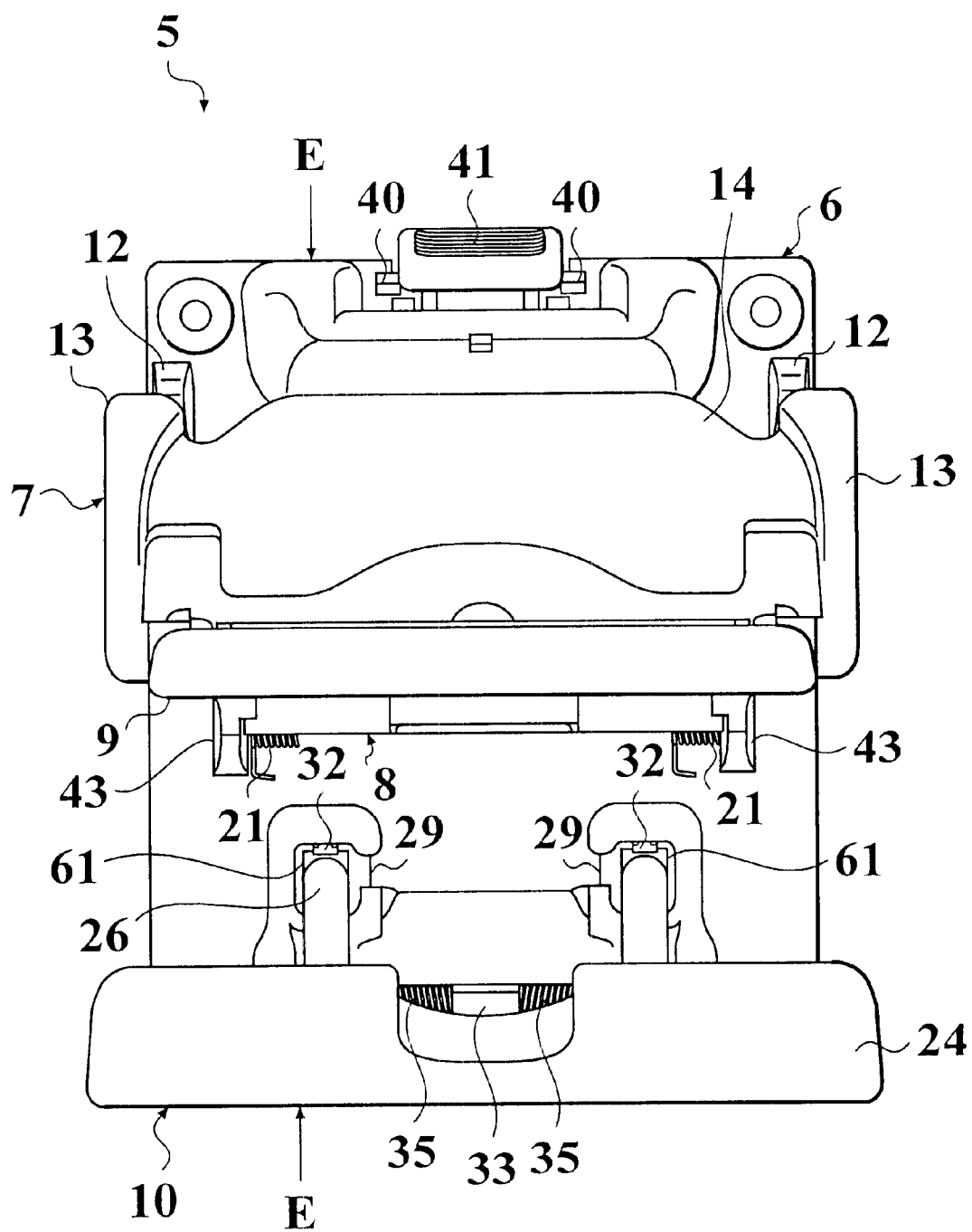
FIG. 4 is a front view of the container holder according to the embodiment of the present invention.
Figure 5:
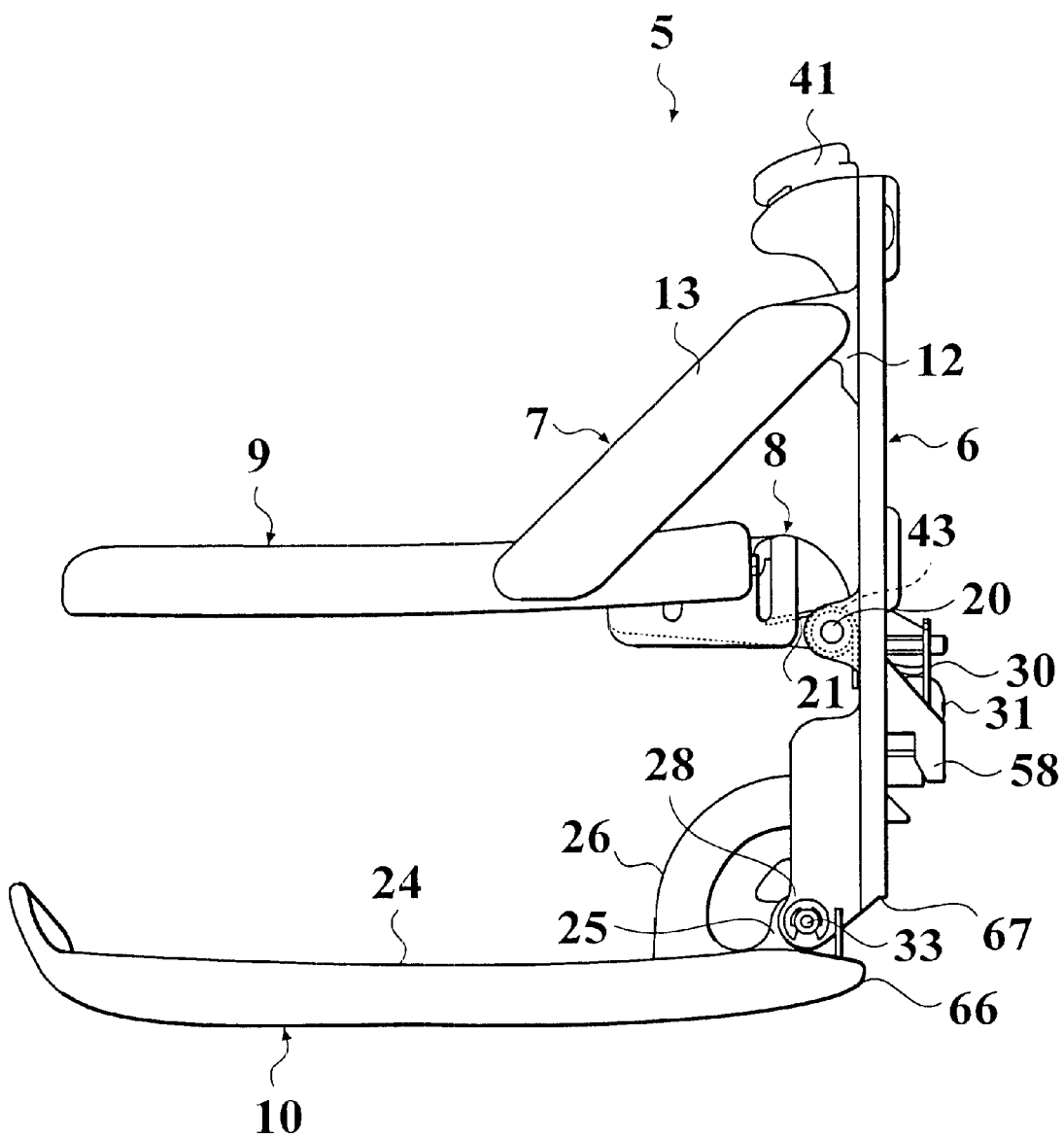
FIG. 5 is a side view of the container holder according to the embodiment of the present invention.
Figure 6:
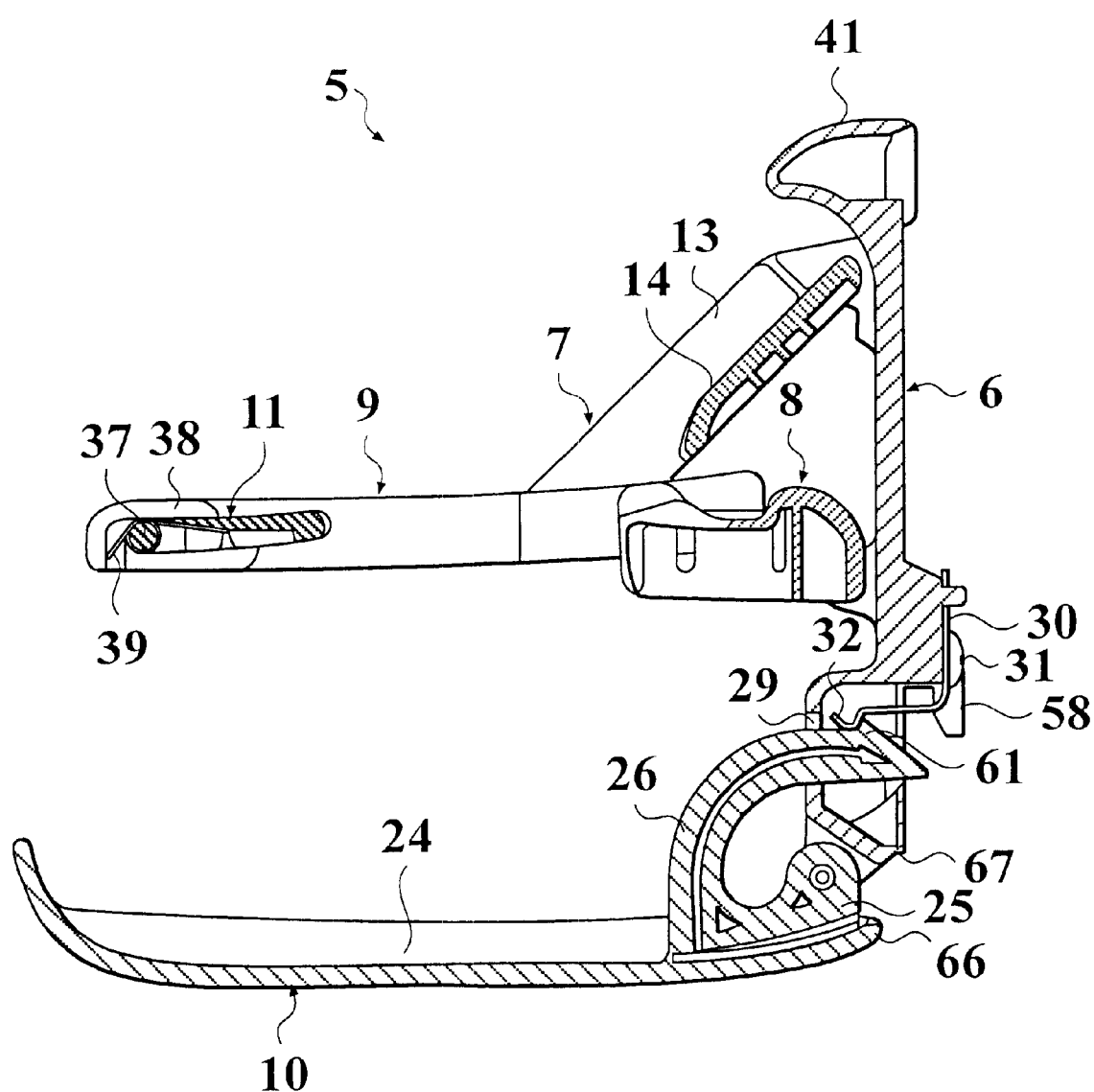
FIG. 6 is a cross-section taken along the line E—E in FIG. 4.
Figure 7:
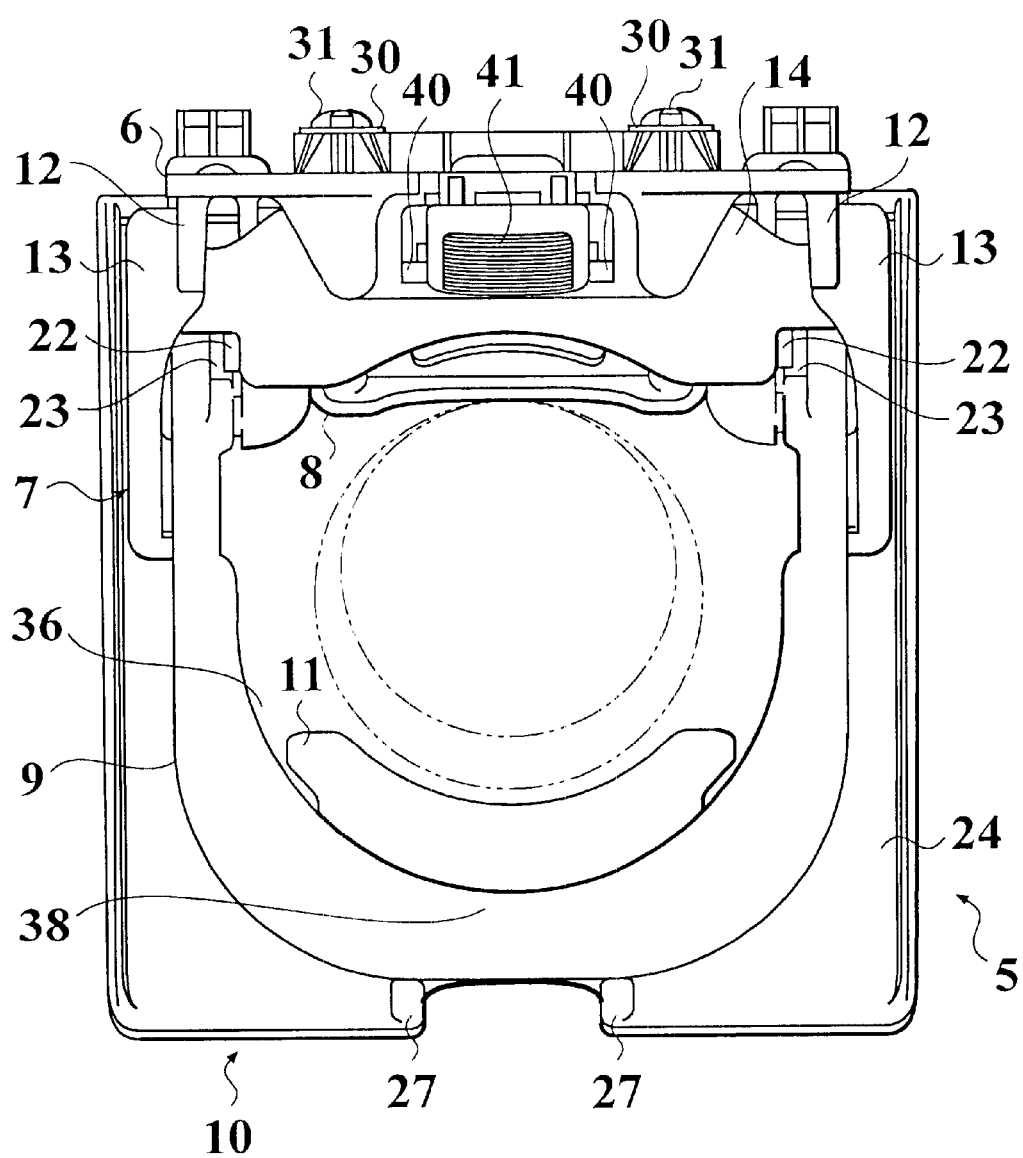
FIG. 7 is a plan view of the container holder according to the embodiment of the present invention.
Figure 8:
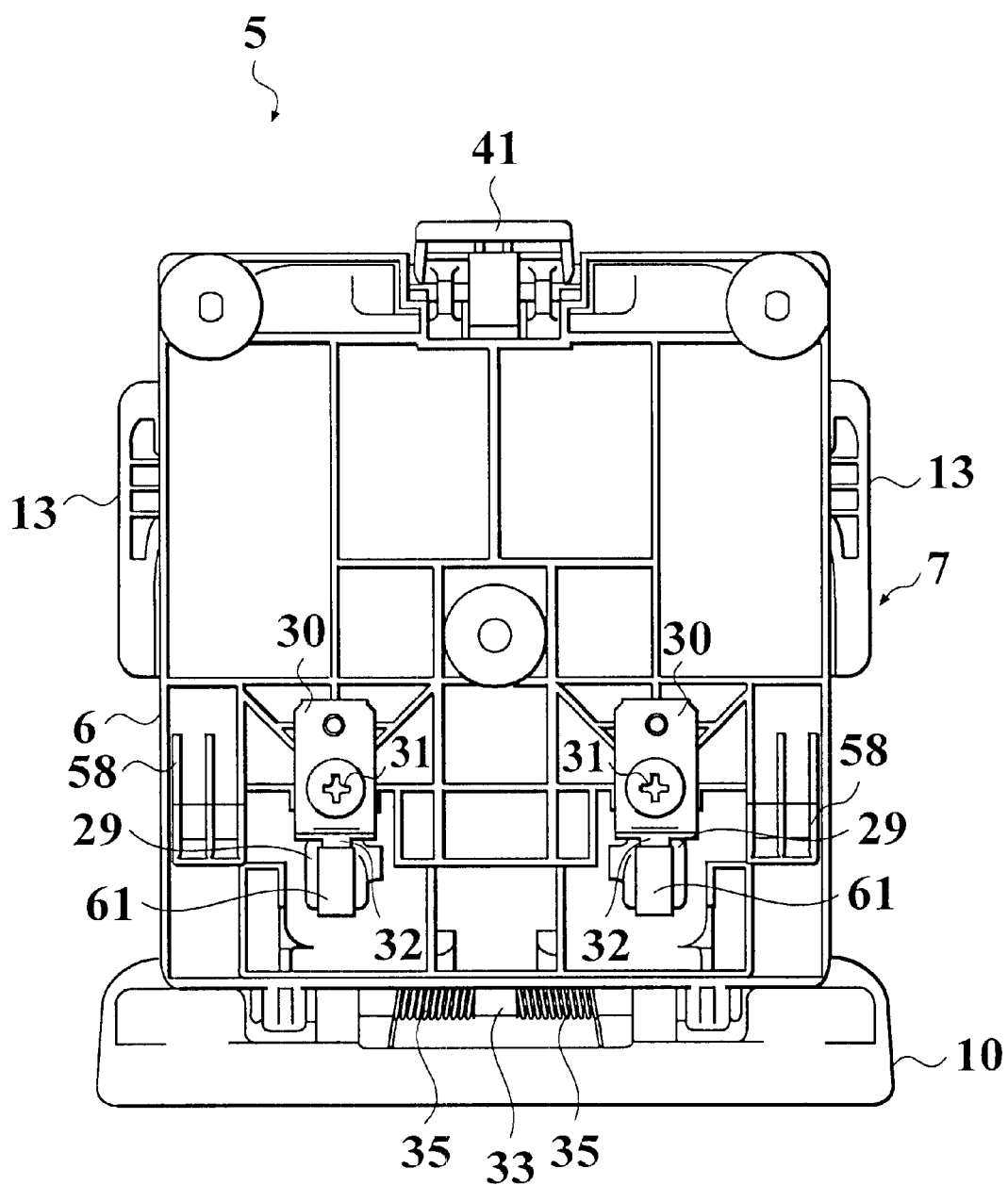
FIG. 8 is a back view of the container holder according to the embodiment of the present invention.

The cup holder 5 and the side cover 4 will be explained in detail. FIG. 2 is a perspective exploded view showing that the cup holder 5 is detached from the side cover 4. FIG. 3 is a perspective exploded view of the exploded cup holder 5. FIG. 4 is a front view of the cup holder 5. FIG. 5 is a side view of the cup holder 5. FIG. 6 is a cross-section taken along the line E—E in FIG. 4. FIG. 7 is a plan view of the cup holder 5. FIG. 8 is a back view of the cup holder 5. FIG. 2, FIG. 4, FIG. 5, FIG. 6, FIG. 7 and FIG. 8 show a state that the container can be held in the cup holder 5 (a position of the cup holder 5 in this state is referred to as "a opened position"). FIG. 4, FIG. 5, FIG. 6, FIG. 7 and FIG. 8 show a state that the cup holder 5 is detached from the side cover 4.

As shown in FIG. 2, a recess portion 51 opening toward a lower side is formed in the fore portion of the side cover 4. A pair of penetrating openings 52 which penetrate the side cover 4 from a front surface to a back surface are formed in a bottom surface of the recess portion 51. The penetrating openings 52 are disposed on opposite sides of the upper edge portion of the bottom surface of the recess portion 51. A penetrating opening 55 which penetrates the side cover 4 from the front surface to the back surface is formed in a central portion of the bottom surface of the recess portion 51. In a lower portion of the bottom surface of the recess portion 51, a pair of penetrating openings 53 which penetrate the side cover 4 from the front surface to the back surface are formed. A penetrating opening 54 which penetrates the side cover 4 from the front surface to the back surface is formed below the penetrating opening 55. The penetrating opening 54 is formed into an approximately H-like shape. A projection 65 which projects toward a side of the side cover 4 is formed in a lower edge portion of the side cover 4 below the recess portion 51.

As shown in FIG. 2 to FIG. 8, the cup holder 5 comprises a base member 6 to which various members are attached, and the first holding member 8 and second holding member 9 for holding the container such that the first and second holding members 8 and 9 surround a side surface of the container. The cup holder 5 also comprises an arm member 7 for turnably supporting the first holding member 8, a saucer member 10 on which the container is placed, a flap member 11 for stably holding the container, or the like.

The base member 6 is made of hard resin. A pair of penetrating openings 56 which penetrate the base member 6 from a front surface to a back surface are formed in an upper edge portion of the base member 6. In a central portion of the base member 6, a penetrating opening 57 is formed from the front surface to the back surface. A pair of engaging claws 58 are formed on a lower portion of the back surface of the base member 6, and project therefrom. The engaging claws 58 are bent, and indicate a lower portion. A pair of bearings 12 are formed on both side portions of the upper portion of the front surface of the base member 6, and project therefrom.

The back surface of the base member 6 abuts with the bottom surface of the recess portion 51, so that the base member 6 extends vertically and is attached to the side cover 4. That is, the engaging claws 58 engage with the side cover 4 below the penetrating openings 53, while the engaging claws 58 penetrate from the front surface of the side cover 4 to the back surface thereof through the penetrating openings 53. Furthermore, screws (bolts) 59 penetrate the penetrating openings 56 and the penetrating openings 52, and are fixed with nuts (not shown) on the back surface of the side cover 4. The screws 59 are fixed with the nuts, thereby the upper portion of the base member 6 is secured to the upper portion of the side cover 4. A screw 60 penetrates the penetrating opening 57 and the penetrating opening 55, and is fixed with another nut (not shown) on the back surface of the side cover 4.

The arm member 7 is made of hard resin. The arm member 7 comprises a pair of long arm portions 13 and a flange portion 14 between the two arm portions 13. The arm portions 13 and the flange portion 14 are integrally formed. A base edge portion of the arm portion 13 is provided with a shaft portion 15. The shaft portion 15 extends rearward or forward, that is, in a travel direction of the vehicle. The other edge portion of the arm portion 13 is provided with a shaft portion 16 extending rearward or forward. The shaft portions 15 are turnably supported by the bearings 12 of the base member 6. Thereby, the arm member 7 is attached to the base member 6, while the arm member 7 pivots freely up and down on the shaft portions 15.

The second holding member 9 is formed into an approximately U-like shape and made of hard resin. Bearings 17 are formed in the both side portions of the second holding member 9. Further, bearings 18 are formed in the both side portions of the second holding member 9, behind the bearings 17. The shaft portions 16 formed in the other edge portions of the arm portions 13 are turnably supported by the bearings 17. Thereby, the second holding member 9 is attached to the arm member 7, while the second holding member 9 pivots freely up and down on the shaft portions 16. The second holding member 9 is connected to the base member 6 through the arm member 7, while the second holding member 9 is turnable up and down.

The first holding member 8 is made of hard resin. In the both side portions of the first holding member 8, shaft portions 19 extending rearward or forward and projecting outward are formed. Further, shaft portions 20 extending rearward or forward are formed in the both side portions of the first holding member 8, behind the shaft portions 19. The shaft portions 19 are turnably supported by the bearings 18 of the second holding member 9. Thereby, the second holding member 9 is attached to the first holding member 8, while the second holding member 9 pivots freely on the shaft portions 19.

In vertically intermediate portion of the base member 6, bearings 43 are formed on both side portions of the front surface of the base member 6, and which project from the front surface. The shaft portions 20 of the first holding member 8 are turnably supported by the bearings 43. Thereby, the first holding member 8 is attached to the base member 6, while the first holding member 8 pivots freely up and down on the shaft portions 20.

The shaft portions 20 are inserted in coil springs 21. One edge portion of the coil spring 21 abuts with the front surface of the base member 6, while the other edge portion abuts with a lower surface of the first holding member 8. The coil springs 21 energize the fist holding member 8 in a direction that the fist holding member 8 turns upward, that is, in a direction that the fist holding member 8 turns clockwise in FIG. 5. Thus, the second holding member 9 is energized in a direction of turning downward on the shaft portions 16, that is, in a direction of turning counterclockwise on the shaft portions 16 in FIG. 5. However, engaging claws 22 described later engage with engaging portions 23, so that the turns of the second holding member 9 and the first holding member 8 by the energizing force of the coil springs 21 are suppressed.

The engaging claws 22 are formed in the both side portions of the first holding member 8, and disposed between the shaft portions 19 and the shaft portions 20. The engaging claws 22 bend at bases thereof abutting with a body of the first holding member 8. The engaging portions 23 are formed in the both side portions of the second holding member 9, and disposed behind the bearings 18, that is, back edge portions of the second holding member 9. The engaging portions 23 are located under the engaging claws 22. The engaging claws 22 are brought into contact with the engaging portions 23. Thereby, the turnings of the second holding member 9 and the first holding member 8 by the energizing force of the coil springs 21 are suppressed. While the engaging claws 22 abut or engage with the engaging portions 23, the second holding member 9 is held in an approximately horizontal position.

When the second holding member 9 is held in the approximately horizontal position, the first holding member 8 and the second holding member 9 form a hold opening 36 which is circularly surrounded by the first holding member 8 and the second holding member 9. When the container is inserted in the hold opening 36, the horizontal movement of the container is limited, so that the container is held in the cup holder 5.

The flap member 11 is attached to the second holding member 9, and is located in the hold opening 36 as shown in FIG. 7 when looking in plan. Back edge of the flap member 11 has an approximately arc-like shape. A shaft portion 37 extending rearward or forward is formed in a front edge portion of the flap member 11. On the other hand, in a front edge portion of the second holding member 9, a flange portion 38 extending from side to side is formed so that the flange portion 38 will face the hold opening 36. A bearing (not shown) is formed in a lower surface of the flange portion 38. The bearing turnably supports the shaft portion 37. Thereby, the flap member 11 is turnably attached to the second holding member 9. The shaft portion 37 is inserted in the coil spring 39. One edge portion of the coil spring 39 abuts with the lower surface of the flap member 11, while the other edge portion of the coil spring 39 abuts with the lower surface of the flange portion 38. The coil spring 39 energizes the flap member 11 in the direction that the flap member 11 turns upward, that is, in the direction that the flap member 11 turns counterclockwise in FIG. 5. However, the upper surface of the flap member 11 is brought into contact with the lower surface of the flange portion 38, so that the turn of the flap member 11 by the energizing force of the coil spring 39 is suppressed. While the flap member 11 abuts with the flange portion 38, the flap member 11 is held in an approximately horizontal position, and the flap member 11 extends backward from the flange portion 38 when looking in plan.

The saucer member 10 comprises an approximately rectangular and plate-like saucer body 24, a pair of shaft supporting portions 25 formed in a base edge portion of the saucer body 24, a pair of curved bars 26 projecting upward from the base edge portion of the saucer body 24 and curving backward, and a pair of engaging portions 27 formed in a front edge portion of the saucer body 24. These are integrally formed, and the saucer member 10 is made of resin. The front edge portion is opposite edge portion of the base edge portion. The curved bars 26 curve around the shaft supporting portions 25 (that is, a shaft member 33 described later) in an approximately arc. A head of the curved bar 26 is provided with an engaging claw 61 (the first engaging portion).

A pair of penetrating openings 29 penetrating from the back surface to the front surface of the base member 6 are formed in a lower portion of the base member 6. The penetrating openings 29 locate in the penetrating opening 54 of the side cover 4 when looking from the front, as shown in FIG. 4. Leaf springs 30 made of metal and having flexibility are attached to the back surface of the base member 6 through screws 31 right above the penetrating openings 29. An engaging tip 32 (the second engaging portion) is formed at a front edge of the leaf spring 30, and the engaging tip 32 is disposed in the penetrating opening 29.

On a lower edge portion of the front surface of the base member 6, bearings 28 are formed and projected. The shaft member 33 extending from side to side is inserted in the bearings 28. The shaft member 33 is attached to the base member 6 with an E-ring 34. The shaft member 33 is also inserted in the shaft supporting portions 25 of the saucer member 10, so that the shaft member 33 turns freely against the shaft supporting portions 25. Thereby, the saucer member 10 is attached to the lower edge portion of the base member 6, while the saucer member 10 pivots freely up and down on the shaft member 33. When the base member 6 is attached to the side cover 4, the projection 65 which is formed in the lower edge portion of the side cover 4 projects downward and below the shaft supporting portions 25 and the bearings 28. The projection 65 covers a space between the base member 6 and the saucer member 10 from the lower side.

The shaft member 33 is inserted in coil springs 35. One edge portion of the coil spring 35 abuts with the front surface of the base member 6. The other edge portion of the coil spring 35 abuts with an upper surface of the saucer body 24. Hereinafter, the upper surface of the saucer body 24 in the horizontal position is referred to as a back surface, while a lower surface of the saucer body 24 in the horizontal position is referred to as a front surface. The coil springs 35 energize the saucer member 10 in a direction that the saucer member 10 turns downward, that is, in a direction that the saucer member 10 turns counterclockwise in FIG. 5. When the engaging claws 61 which are described later engage with the engaging tips 32, the turn of the saucer member 10 by the energizing force of the coil springs 35 is suppressed, so that the saucer body 24 is held in the approximately horizontal position.

The curved bars 26 are provided with the engaging claws 61 on the heads thereof. The curved bars 26 extend from the back surface of the saucer body 24 toward the penetrating openings 29, and penetrate the penetrating openings 29 and the penetrating opening 54. The engaging claws 61 are located behind the engaging tips 32, and brought into contact with the engaging tips 32. The curved bars 26 move through the penetrating openings 29 and the penetrating opening 54 as the saucer member 10 turns. However, the engaging claws 61 are brought into contact with the engaging tips 32, suppressing the turn of the saucer member 10. That is, the turn of the saucer member 10 by the coil springs 35 is suppressed by abutment or engagement of the engaging claws 61 with the engaging tips 32.

When the saucer member 10 in the horizontal position receives an excessive load in the direction of turning downward, the leaf springs 30 bend because of the flexibility thereof. Thus, the engagement between the engaging tips 32 and the engaging claws 61 is released so that the saucer member 10 can turn further downward beyond the horizontal position. When the saucer member 10 turns further downward beyond the horizontal position, a base edge 66 of the saucer body 24 is brought into contact with a lower edge 67 of the base member 6, and the front edge portion of the saucer body 24 is brought into contact with the floor 62 of the interior (refer to FIG. 9 to FIG. 11). Thereby, the turn of the saucer member 10 is stopped. That is, a length between the base edge portion and front edge portion of the saucer body 24, or a height from the floor 62 to the bearings 28 is set for a predetermined value so that the front edge portion of the saucer body 24 will be brought into contact with the floor 62 when the saucer member 10 turns further downward beyond the horizontal position. When the front edge portion of the saucer body 24 abuts with the floor 62, the projection 65 of the side cover 4 is located under the front surface of the saucer body 24 and along the front surface of the saucer body 24 (refer to FIG. 9). The projection 65 extends sideward from the lower edge of the side cover 4, and curves upward in the vicinity of the front surface of the saucer body 24, and then extends upward along the front surface of the saucer body 24. Further, when the front edge portion of the saucer body 24 abuts with the floor 62, the angle between the horizontal position and the abutting position of the saucer body 24 is smaller than 90 degrees, and concretely, it is about 45 degrees or may be about 60 degrees.

The front edge portion of the saucer body 24 is provided with the engaging portions 27. On the other hand, the upper edge portion of the base member 6 is provided with engaging claws 40 which are capable of engaging with the engaging portions 27. The upper edge portion of the base member 6 is also provided with a push button 41, integrated with the engaging claws 40. A leaf spring 42 is fitted in the back of the push button 41. When the saucer member 10 in the horizontal position is turned upward against the energizing force of the coil springs 35, the engaging portions 27 engage with the engaging claws 40. When the engaging portions 27 engages with the engaging claws 40, the saucer body 24 stands approximately vertically and covers the recess portion 51 of the side cover 4. Then, the front surface of the saucer body 24 is flush with the front surface of the side cover 4, as shown in FIG. 1. In this state, the arm member 7, the first holding member 8, the second holding member 9, the flap member 11 and the like are housed in a space surrounded by the saucer body 24 and the base member 6. Hereinafter, a position of the cup holder 5 in this state is referred to as a housed position.

When the engaging portions 27 engage with the engaging claws 40 and the push button 41 is pressed downward against the leaf spring 42, the engaging claws 40 are separated from the engaging portions 27, so that the engagement between the engaging portions 27 and the engaging claws 40 is released.

The action and using method of the cup holder 5 constructed as described above will be explained.

When the cup holder 5 is held in the opened position, that is, the engaging claws 22 engage with the engaging portions 23 to hold the second holding member 9 in the approximately horizontal position, and the engaging claws 61 engage with the engaging tips 32 to hold the saucer body 24 in the approximately horizontal position, the passenger inserts the container in the hold opening 36 from above. The container is brought into contact with the flap member 11, so that the flap member 11 is turned downward by the container against the energizing force of the coil spring 39. When the passenger further moves the container downward, a bottom surface of the container is brought into contact with the back surface of the saucer body 24, so that the container is placed on the saucer body 24. In this state, the flap member 11 abuts with the side surface of the container by the energizing force of the coil spring 39, and the container is sandwiched between the flap member 11 and the first holding member 8. Accordingly, the container is stably held. Furthermore, in such a state, because the container is held by the saucer member 10, moment toward the side cover 4 acts on the base member 6 with respect to the upper portion of the base member 6. That is, the lower portion of the base member 6 is pressed against the bottom surface of the recess portion 51 by the weight of the container held on the saucer member 10.

When the passenger pulls upward the container which is held on the saucer member 10 out of the hold opening 36, the flap member 11 turns upward by the energizing force of the coil spring 39, and then is brought into contact with the flange portion 38. Thus, the flap member 11 is maintained in the approximately horizontal position. In FIG. 7, a cylindrical container is shown with chain double-dashed lines.

Figure 9:
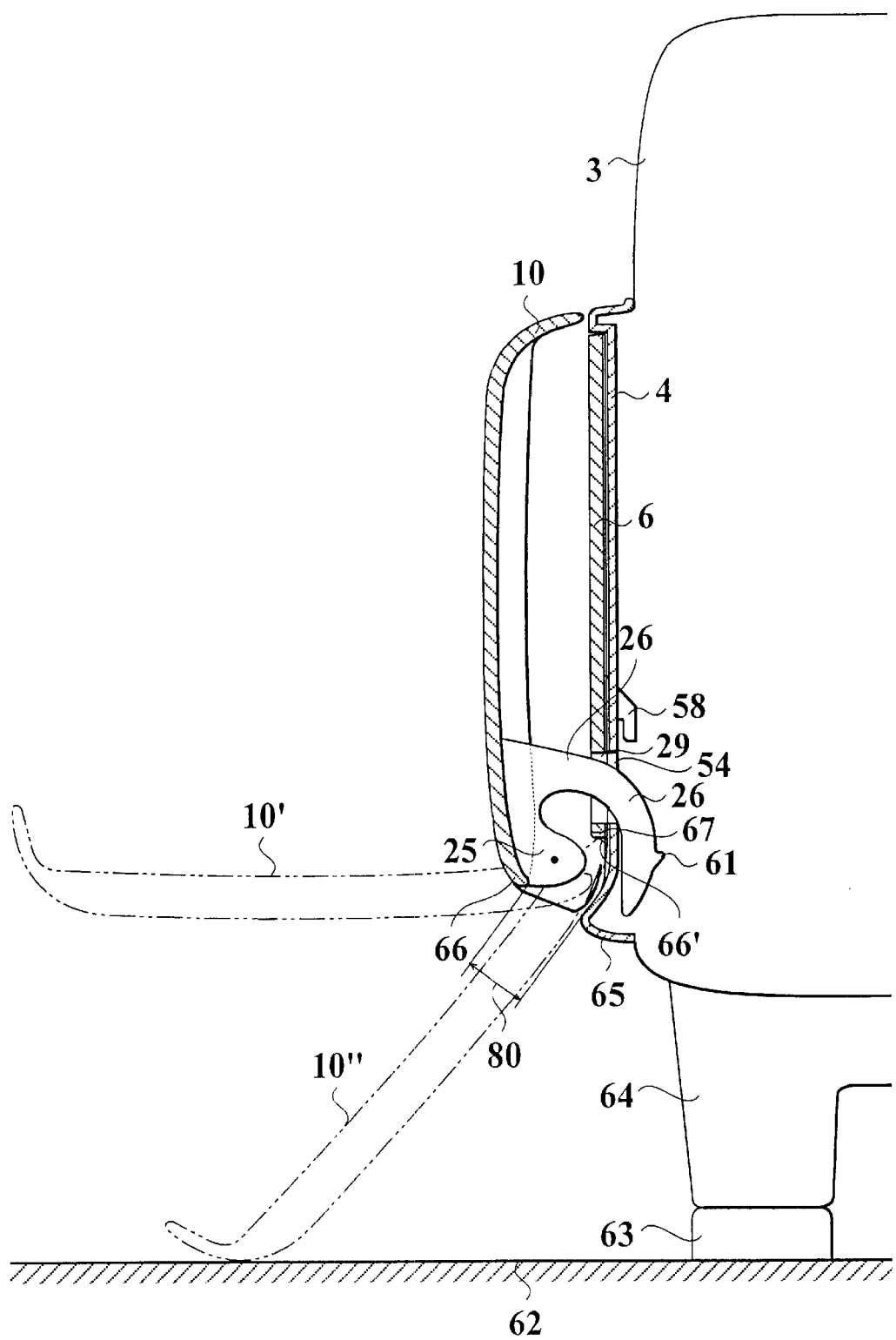
FIG. 9 is a sectional side view showing schematically the container holder.

When the cup holder 5 is held in the opened position, and the passenger pushes up the saucer member 10, the saucer member 10 is turned upward on the shaft member 33 against the energizing force of the coil springs 35. Thereby, the engaging claws 61 are separated backward from the engaging tips 32. The curved bars 26 are turned on the shaft member 33, and the heads of the curved bars 26 are moved to the side of the back surface of the side cover 4 and below the penetrating opening 54. When the passenger further turns upward the saucer member 10, the saucer member 10 is brought into contact with the second holding member 9. When the saucer member 10 is further turned upward, the second holding member 9 is pushed up by the saucer member 10, and turned upward on the shaft portions 19, while the arm member 7 is turned downward on the shaft portions 15. When the saucer member 10 is further turned upward, as shown in FIG. 9, the arm member 7, the second holding member 9, the flap member 11 and the saucer body 24 extend approximately vertically and come to the standing position, so that the engaging portions 27 engage with the engaging claws 40. Thus, the cup holder 5 is closed and held in the housed position, while the arm member 7 and the second holding member 9 are held in the standing position. When the cup holder 5 is held in the housed position, the engaging claws 40 are held to engage with the engaging portions 27 by the energizing force of the leaf spring 42.

When the cup holder 5 is held in the housed position, the heads of the curved bars 26 are located in the side of the back surface of the side cover 4 which intervenes between the saucer body 24 and the heads of the curved bars 26 which are hooked to the lower portion of the side cover 4. Since the curved bars 26 are hooked to the lower portion of the side cover 4, the cup holder 5 is stably attached to the side cover 4.

Furthermore, when the cup holder 5 is held in the housed position, if the passenger pulls the saucer member 10, the load acts in the direction that the base member 6 is separated from the side cover 4. However, because the curved bars 26 are hooked to the lower portion of the side cover 4, the load is not concentrated in the portions where the base member 6 and the side cover 4 are secured with the screws 59 or the screw 60. Therefore, even if the passenger pulls accidentally the saucer member 10, the breakage of the base member 6 and the side cover 4 is suppressed.

When the cup holder 5 is held in the housed position, since the projection 65 projects from the lower edge portion of the side cover 4, a length between the projection 65 and the bottom (base) edge 66 of the saucer member 10 becomes short, and the opening 80, as shown in FIG. 9, between them becomes small. Accordingly, it does not cause disfigurement of the side portion of the vehicle seat 4. In FIG. 9, a reference numeral 10' indicated with a chain double-dashed line shows imaginary the saucer member 10 which is held in the horizontal position. In FIG. 9, for simplifying the drawing, the first holding member 8 and the second holding member 9 are not shown.

When the cup holder 5 is held in the housed position, and the passenger presses down the push button 41 against the leaf spring 42, the engagement between the engaging portions 27 and the engaging claws 40 is released. Thereby, the second holding member 9 is turned downward by the energizing force of the coil springs 21, while the saucer member 10 is turned downward by the energizing force of the coil springs 35. Then, the engaging portions 23 of the second holding member 9 engage with the engaging claws 22 of the first holding member 8, so that the arm member 7, the first holding member 8 and the second holding member 9 are stopped, and the second holding member 9 is held in the approximately horizontal position. On the other hand, the engaging claws 61 of the saucer member 10 engage with the engaging tips 32, stopping the saucer member 10. Thus, the saucer body 24 is held in the approximately horizontal position. That is, the cup holder 5 is held in the opened position.

Figure 10:
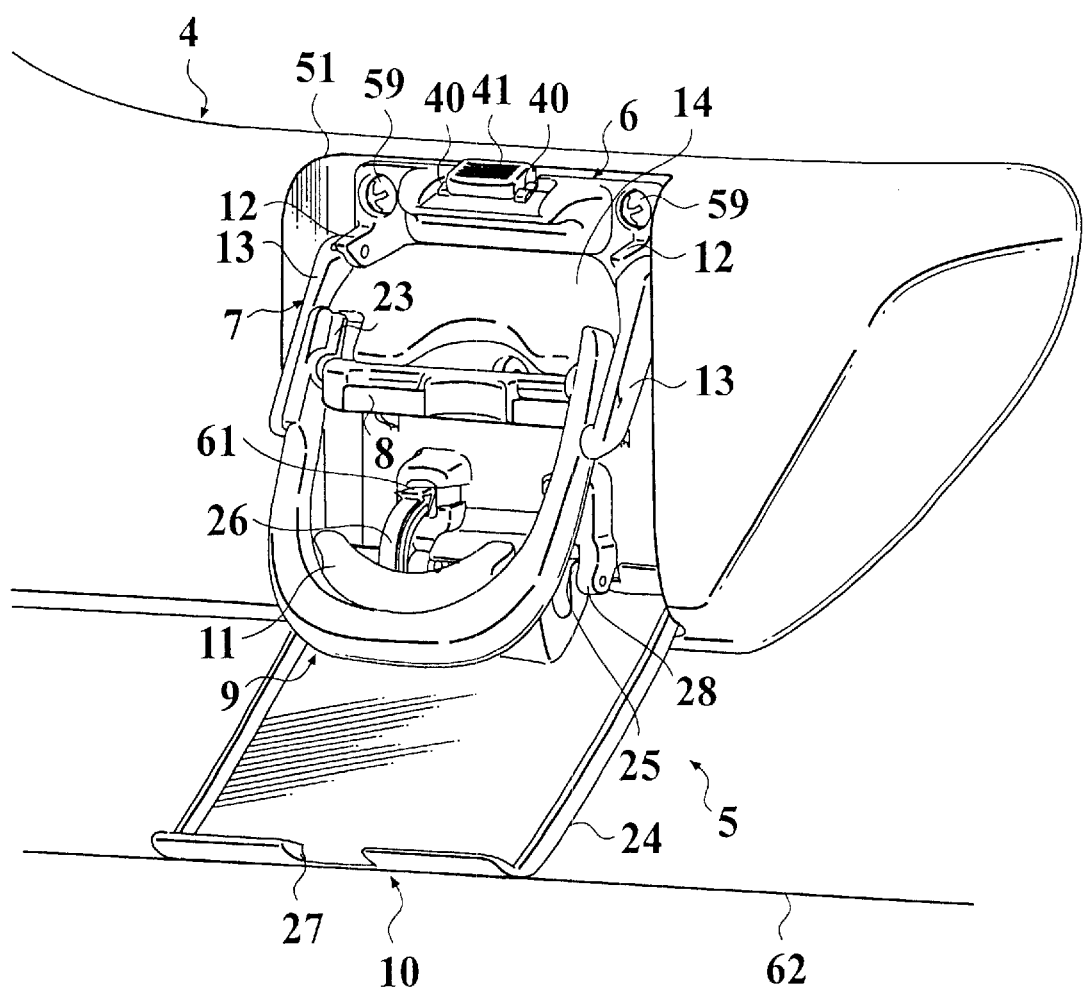
FIG. 10 is a perspective view of the container holder according to the embodiment of the present invention, showing that a holding member and a saucer member hang beyond the horizontal position.
Figure 11:
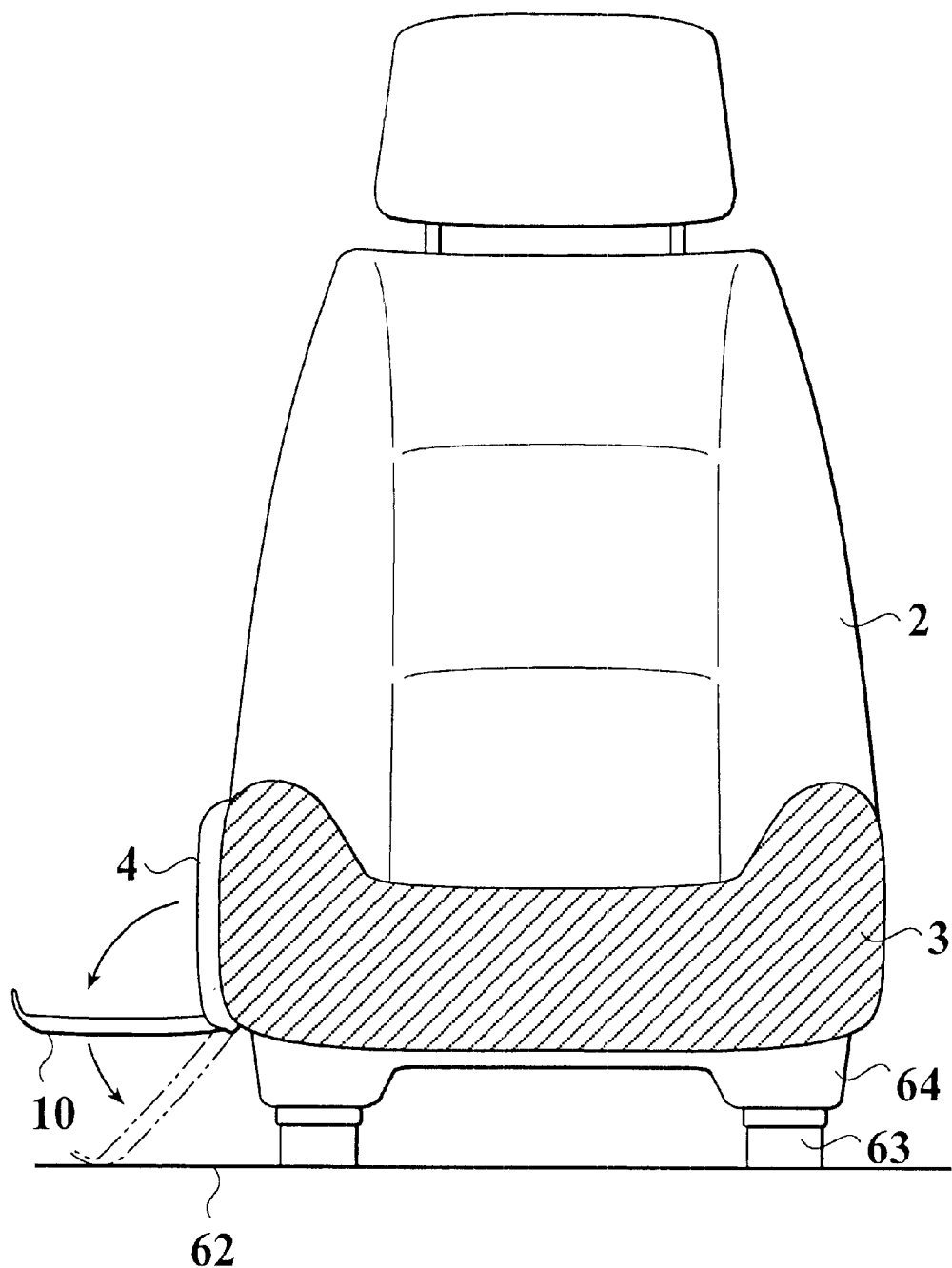
FIG. 11 is a cross-section taken along the line F—F in FIG. 1.

When the cup holder 5 is held in the opened position, for example, if the body of the passenger is accidentally hit against the saucer member 10, an excessive load which is larger than the weight of the container is applied to the saucer body 24 which is held in the horizontal position, in the direction of turning downward. Because the leaf springs 30 have flexibility, the engaging claws 61 bend the leaf springs 30 under the excessive load. Thereby, the engagement between the engaging tips 32 and the engaging claws 61 is released, so that the engaging claws 61 can move to the front of the engaging tips 32. Accordingly, in case the excessive load is applied, the saucer member 10 can turn downward. When the saucer member 10 turns downward, the front edge portion of the saucer body 24 is brought into contact with the floor 62 of the interior, while the base edge 66 of the saucer body 24 is brought into contact with the lower edge 67 of the base member 6. Accordingly, the downward turning of the saucer member 10 is stopped. That is, as shown in FIG. 10 or FIG. 11, the saucer member 10 hangs, and the front edge portion of the saucer member 10 (that is, the saucer body 24) abuts with the floor 62 of the interior. Therefore, the saucer member 10 does not turn downward any longer, so that the front surface of the saucer member 10 is not hit against the projection 65.

In this state that the saucer member 10 hangs, when the passenger turns upward the saucer body 24, the engaging claws 61 cross over the engaging tips 32 and engage with the engaging tips 32. Thus, the saucer body 24 returns to the original, horizontal position. In FIG. 9, a reference numeral 10″ indicated with a chain double-dashed line shows imaginary the saucer member 10 which hangs, and a reference numeral 66′ shows imaginary the base edge 66 which abuts with the lower edge 67.

As described above, according to the present embodiment, even if the excessive load is accidentally applied to the saucer member 10, because the engaging tips 32 have flexibility, the engaging tips 32 bend. Thereby, the engagement between the engaging tips 32 and the engaging claws 61 is released. Therefore, the breakage of the engaging claws 61, the curved bars 26 or the leaf springs 30 is suppressed and thickening of the wall thickness of the engaging claws 61, the curved bars 26 or the leaf springs 30 is not required.

When the saucer member 10 turns downward with great force from the horizontal position, the front edge portion of the saucer member 10 is received on the floor 62 of the interior. Accordingly, the front surface of the saucer member 10 does not hit against the projection 65, so that the saucer member 10 and the projection 65 are not hurt. When the saucer member 10 hangs, the front edge portion of the saucer member 10 abuts with the floor 62. Thus, in this state, even if the passenger accidentally applies the downward load to the saucer member 10, the breakage of the saucer member 10 is prevented.

Furthermore, the projection 65 projects to the lower side of the shaft supporting portions 25 of the saucer member 10 and the bearings 28 of the base member 6, so that the shaft supporting portions 25 and the bearings 28 are covered with the projection 65 from the lower side. Accordingly, touches with the hand, finger or the like of the passenger or the like on the shaft supporting portions 25, the bearings 28 or the shaft member 33 are prevented. The movable portions, such as the shaft supporting portions 25, the bearings 28 or the shaft member 33, are covered with the projection 65 from the lower side, it does not cause disfigurement of the side cover 4 and the cup holder 5.

From the foregoing description, one skilled in the art can easily ascertain the essential characteristics of this invention, and without departing from the spirit and scope thereof, can make various changes and modifications of the invention to adapt it to various usage and conditions.

For example, the engaging portions 23 or the engaging claws 61 may have flexibility. Furthermore, instead of the coil springs 21, 35 and 39, the elastic member, such as the leaf spring or the like, which energizes elastically other members may be used.

The entire disclosure of Japanese Patent Application No. 2001-242219 filed on Aug. 9, 2001 including specification, claims, drawings and summary are incorporated herein by reference in its entirety.

What is claimed is:

1. A vehicle seat having a container holder, comprising:
   a container holder comprising:
      a base member extending vertically; and
      a saucer member turnable up and down, of which a base edge portion is supported to a lower portion of the base member;
      wherein a container can be placed on the saucer member when the saucer member is held in a horizontal position, and the saucer member is capable of turning downward from the horizontal position; and
   a seat body mounted on a floor of an interior of a vehicle, the base member being attached to the seat body in a side portion thereof, and the seat body being provided with a projection on a side cover of the seat body, the projection projecting below a bearing between the base member and the saucer member;
   wherein the saucer member is set such that a downward turning of the saucer member is stopped when the saucer member turns downward beyond the horizontal position so that another edge portion of the saucer member is brought into contact with the floor, and the projection has a shape along a surface of the saucer member when the another edge portion of the saucer member abuts with the floor.

2. A vehicle seat having a container holder, comprising:
   a container holder comprising:
      a base member extending vertically;
      a saucer member turnable up and down, of which a base edge portion is supported to a lower portion of a front surface of the base member;
      a first engaging portion provided to the saucer member; and
      a second engaging portion attached to the base member and holding the saucer member in a horizontal position which is approximately horizontal by engaging with the first engaging portion, wherein a container can be placed on the saucer member when the saucer member is held in the horizontal position;
      wherein when at least one of the first engaging portion and the second engaging portion bends, engagement between the first engaging portion and the second engaging portion is released, so that the saucer member turns downward; and
   a seat body mounted on a floor of an interior of a vehicle, the base member being attached to the seat body in a side portion thereof, and the seat body being provided with a projection on a side cover of the seat body, the projection projecting below a bearing between the base member and the saucer member;

wherein the saucer member is set such that a downward turning of the saucer member is stopped when the saucer member turns downward beyond the horizontal position and another edge portion of the saucer member is brought into contact with the floor, and the projection has a shape along a surface of the saucer member when the another edge portion of the saucer member abuts with the floor.

3. The vehicle seat having a container holder, as claimed in claim 2, wherein an angle of turn of the saucer member from the horizontal position of the saucer member to a position of the saucer member when the another edge portion of the saucer member is brought into contact with the floor is smaller than 90 degrees.

4. The vehicle seat having a container holder, as claimed in claim 1, wherein the projection is formed in a lower edge portion of the side cover.

* * * * *